(12) United States Patent
Ribble et al.

(10) Patent No.: US 7,696,002 B1
(45) Date of Patent: Apr. 13, 2010

(54) ELECTROLYTIC CAPACITOR CASE DESIGN WITH INSERT MOLDED ELASTOMER SEALS

(75) Inventors: Bruce Ribble, Easley, SC (US); Thomas Davis, Greenville, SC (US); Wallace K. Hall, Pickens, SC (US)

(73) Assignee: Pacesette, Inc., Sunnyvale, CA (US)

( * ) Notice: Subject to any disclaimer, the term of this patent is extended or adjusted under 35 U.S.C. 154(b) by 485 days.

(21) Appl. No.: 11/678,977

(22) Filed: Feb. 26, 2007

Related U.S. Application Data

(63) Continuation-in-part of application No. 11/627,060, filed on Jan. 25, 2007, now abandoned.

(51) Int. Cl.
*H01L 21/00* (2006.01)

(52) U.S. Cl. .................... 438/106; 438/55; 438/53; 438/7; 361/528; 361/532; 361/519; 361/540; 361/520; 29/25.03

(58) Field of Classification Search .............. 29/25.03; 361/528, 532, 519, 540; 438/106, 55, 53, 438/7

See application file for complete search history.

(56) References Cited

U.S. PATENT DOCUMENTS

| | | | |
|---|---|---|---|
| 2003/0195602 A1* | 10/2003 | Boling | 607/122 |
| 2007/0043410 A1* | 2/2007 | Boling | 607/116 |
| 2008/0003142 A1* | 1/2008 | Link et al. | 422/82.08 |
| 2008/0014589 A1* | 1/2008 | Link et al. | 435/6 |

* cited by examiner

*Primary Examiner*—Mary Wilczewski
*Assistant Examiner*—Telly D Green
(74) *Attorney, Agent, or Firm*—Steven M Mitchell

(57) ABSTRACT

Disclosed herein is a method for manufacturing a feed thru for use in an electrolytic capacitor case. First, an electrode is inserted into a liquid injection mold. Liquid elastomer is then injected into the mold to surround a portion of the electrode. The elastomer is cured, and the resulting electrode and feed thru combination is inserted into a machined hole in a capacitor case. The machined hole may be located on either the base or the lid of the capacitor case. In other embodiments, a ferrule may also be placed in the liquid injection mold prior to injecting liquid elastomer. When a ferrule is used, the assembly may be welded into a machined hole in a capacitor case.

13 Claims, 14 Drawing Sheets

ELECTROLYTIC CAPACITOR CASE DESIGN WITH INSERT MOLDED ELASTOMER SEALS

PRIORITY CLAIM

This application is a continuation-in-part of U.S. patent application Ser. No. 11/627,060, filed Jan. 25, 2007 now abandoned, which is incorporated herein by reference.

BACKGROUND OF THE INVENTION

1. Field of the Invention

The present invention relates to electrolytic capacitors and, more particularly, to a method of manufacturing electrode feed thrus for use in an electrolytic capacitor case. The present invention also relates to methods of joining such electrode feed thrus to a capacitor case.

2. Background Art

Compact, high voltage capacitors are utilized as energy storage reservoirs in many applications, including implantable medical devices. These capacitors are required to have a high energy density since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

Electrolytic capacitors are used in ICDs because they have the most nearly ideal properties in terms of size, reliability and ability to withstand relatively high voltage. Conventionally, such electrolytic capacitors typically consist of a cathode electrode, an electrically conductive electrolyte and a porous anode with a dielectric oxide film formed thereon. While aluminum is the preferred metal for the anode plates, other metals such as tantalum, magnesium, titanium, niobium, zirconium and zinc may be used. A typical electrolyte may be a mixture of a weak acid and a salt of a weak acid, preferably a salt of the weak acid employed, in a polyhydroxy alcohol solvent. The electrolytic or ion-producing component of the electrolyte is the salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered, stack structure of electrode materials with separators interposed therebetween, such as those disclosed in the above-mentioned U.S. Pat. No. 5,131,388.

Feed thrus are commonly used to pass an electrode through the case in which the capacitor is held. For example, conventional capacitor designs use elastomer compression feed thrus that are produced from EPDM rubber (ethylene propylene diene monomer rubber) or silicone materials. Assembly of these conventional feed thrus is done manually, which requires a high degree of skill. An operator passes a pin or electrode by hand through a pre-formed elastomer component. The subassembly is then passed through a precision machined hole in the capacitor case. In such a manual process, passing the wire through the elastomer component can damage the elastomer, and generally results in a less than ideal bond between the elastomer and the electrode. This can cause yield losses in the finished capacitor. Another problem with conventional designs is that the use of EPDM adds additional costs due to the high risk of contamination of that material. Further, such a manual method is costly because it requires a high degree of operator efficiency. There is, therefore, a need for improved methods to increase yield while reducing the cost and time associated with manufacturing and assembly.

BRIEF SUMMARY OF THE INVENTION

The present invention provides for a process of insert molding a combination electrode and feed thru assembly for use in a capacitor case. The present invention further provides for securing the assembly to a capacitor case.

In one embodiment, the present invention provides for a process of manufacturing a feed thru assembly wherein a pin or wire is encased in a liquid elastomer using liquid injection molding. This process comprises a) inserting a pin or wire (the electrode) into a mold, b) injecting liquid elastomer into the mold, and c) curing the elastomer and electrode combination. Thereafter, the completed feed thru assembly may be inserted into a pre-machined hole in a capacitor case. The feed thru produced by this process provides 1) electrical isolation between the electrode and the capacitor case, and 2) a liquid tight seal between the capacitor case and the center electrode.

In another embodiment, the present invention provides for a process of manufacturing a feed thru assembly similar to the first embodiment, wherein the electrode and elastomer are further encased in a ferrule. This process comprises a) inserting a ferrule and a pin or wire (the electrode) into a mold cavity, b) injecting a liquid elastomer into the mold such that the elastomer fills the space between the ferrule and the electrode, and c) curing the ferrule, elastomer, and electrode combination to produce a feed thru assembly. Thereafter, the completed feed thru assembly may be inserted into a pre-machined hole in a capacitor case and welded onto the capacitor case.

The present invention allows for increased capacitor yield and reduced capacitor case manufacturing costs. Further, the present invention allows for use of materials having a higher purity than those currently used in the field, reducing the risk of contaminating the capacitor. The present invention also eliminates the need for a highly skilled operator by allowing for automated production of feed thrus by insert molding.

BRIEF DESCRIPTION OF THE DRAWINGS/FIGURES

DETAILED DESCRIPTION OF THE INVENTION

The present invention provides for a process of manufacturing a combination electrode and feed thru assembly for use with a capacitor case. The present invention also provides for methods of securing the assembly onto a capacitor case.

Preferred embodiments of the present invention are now described. While specific configurations and arrangements are discussed, it should be understood that this is done for illustrative purposes only. A person skilled in the relevant art will recognize that other configurations and arrangements can be used without departing from the spirit and scope of the invention. It will also be apparent to a person skilled in the relevant art that this invention can be employed in a variety of other devices and applications.

Figure 13:
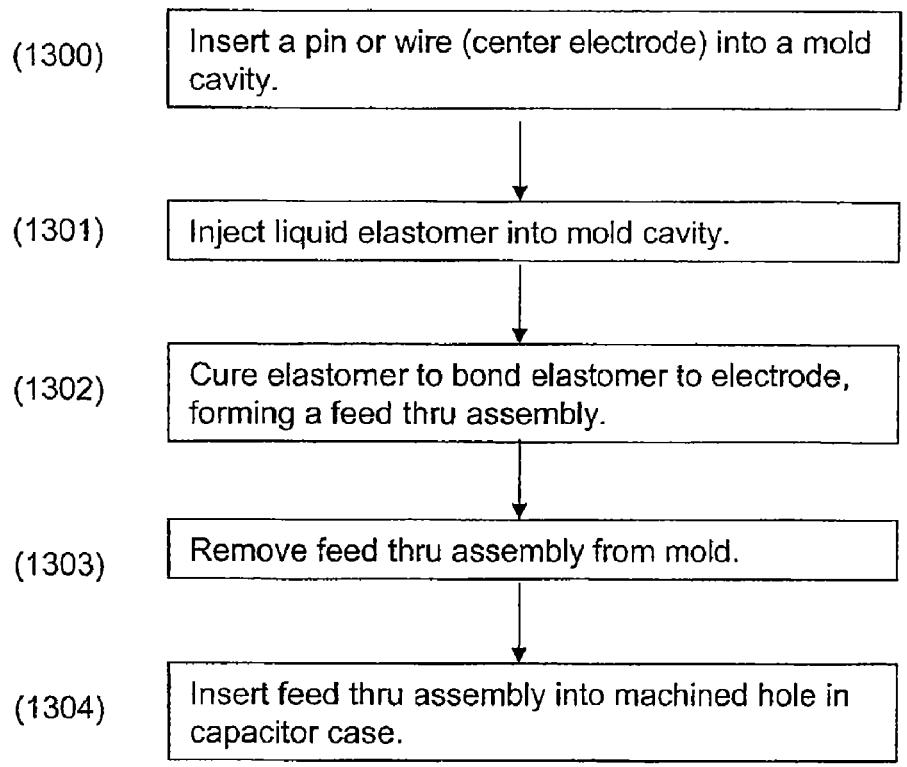
FIG. 13 shows a flowchart of a process for manufacturing the feed thru assembly of FIG. 4.

In one embodiment, the present invention provides for a process of manufacturing a combination electrode and feed thru assembly in which the completed assembly comprises a center electrode surrounded by a molded elastomer seal. This process is detailed in FIGS. 1-4 and FIG. 13. FIG. 13 (steps 1300-1304) is a flow chart of the process according to the first embodiment. This process is merely exemplary and may include only some of the outlined steps and may include additional steps.

Figure 1:
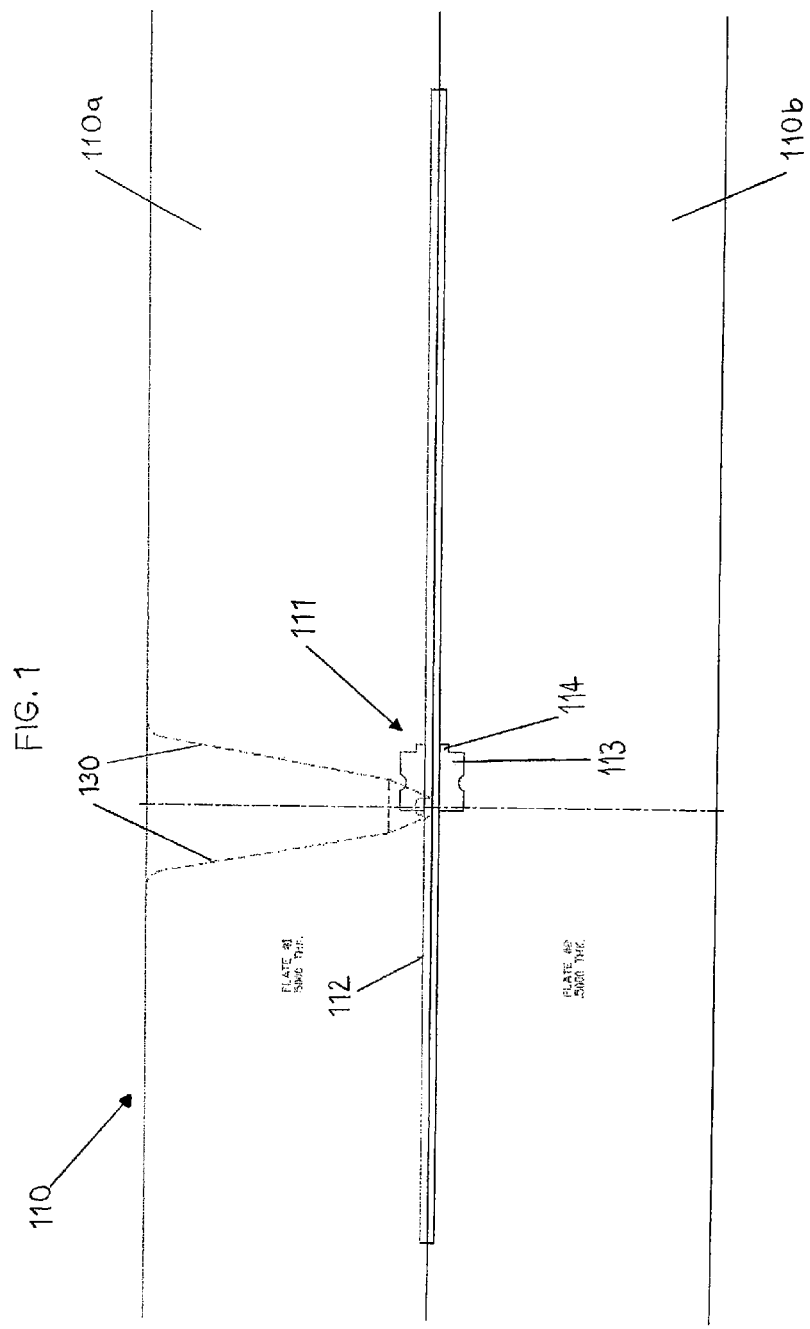
FIG. 1 shows a cross section of an empty liquid injection mold with cavities therein.

FIG. 1 is a cross section of a mold 110 comprising a mold cavity 111. Mold 110 may be made of two halves, shown as top plate 110a and bottom plate 110b, which can be held together in proper alignment to form mold cavity 111. Although a single cavity is shown, the mold used in the present invention could contain two or more cavities. Mold cavity 111 has an electrode holding portion 112 to secure the center electrode. Electrode holding portion 112 can be entirely contained within mold 110, as shown in FIG. 1, or could extend the full width of the mold to allow the electrode inserted therein to protrude from one or more sides of the mold.

Electrode holding portion 112 as shown in FIG. 1 is designed to receive a wire. Alternatively, electrode holding portion 112 could be shaped to accommodate a center electrode in the shape of a pin. Electrode holding portion 112 could also be provided in a variety of other shapes to accommodate, for example, a wire with a bend in at least one end. Mold cavity 111 also has a first cylindrical portion 113 that is filled with elastomer during the injection step. Mold cavity 111 may also comprise a second cylindrical portion 114 having a smaller diameter than first cylindrical portion 113. When second cylindrical portion 114 is used, first cylindrical portion 113 and second cylindrical portion 114 form a single chamber. The mold is designed such that electrode holding portion 112 is approximately concentric with first cylindrical portion 113 and, if present, second cylindrical portion 114. When the process is to be achieved by liquid injection molding, mold 110 may also be provided with one or more runners 130 to deliver liquid elastomer to mold cavity 111. Mold cavity 111 could also comprise additional portions. For example, a third cylindrical portion having a slightly larger diameter than second cylindrical portion 114 could be included to provide a more secure hold when the feed thru assembly is placed in a capacitor case. As would be apparent to one of ordinary skill in the art, mold cavity 111 could define a variety of shapes in order to achieve different objectives. For example, mold cavity 111 could define an elliptical shape in order to accommodate multiple electrodes in parallel while at the same time maintaining adequate insulation and sealing between a capacitor case and the electrodes.

Figure 2:
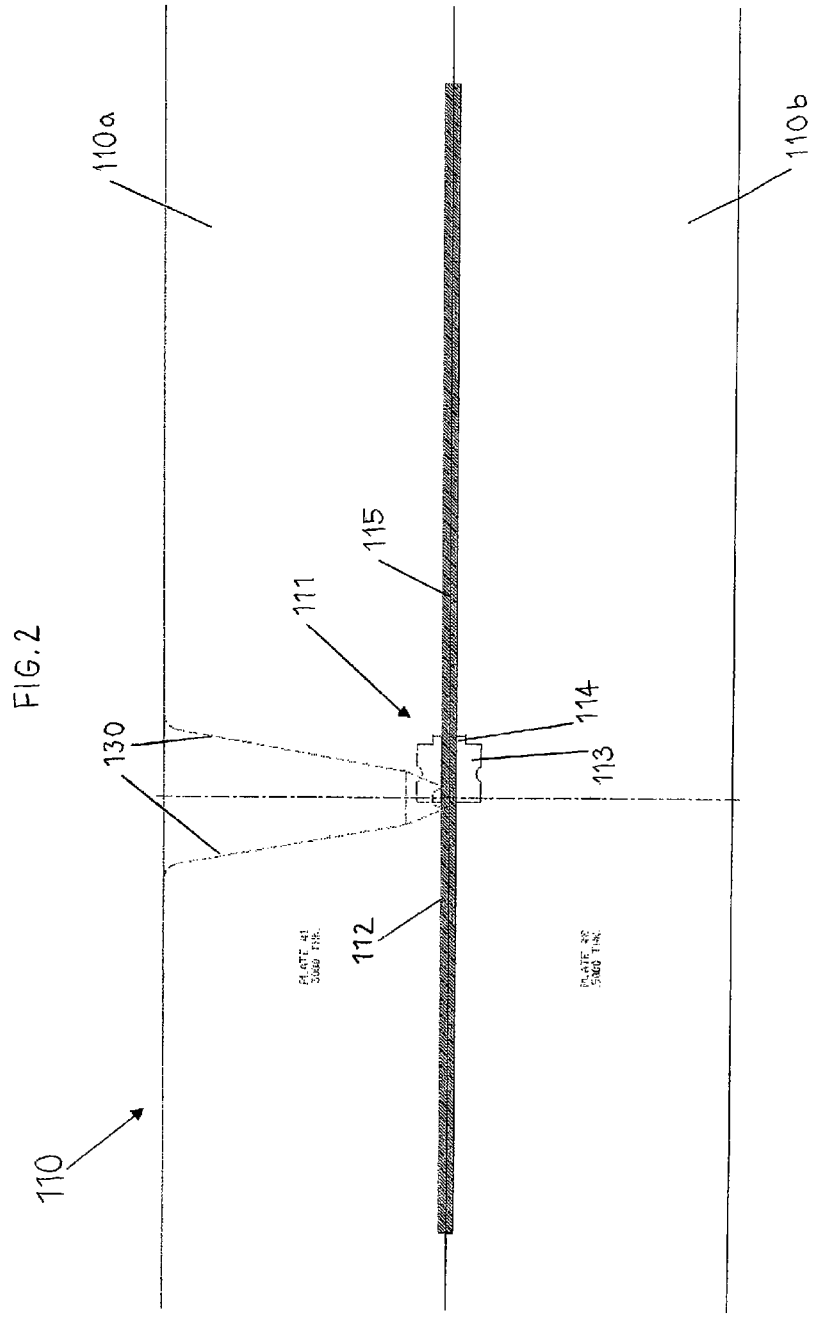
FIG. 2 shows a cross section of a liquid injection mold with a wire placed in a predetermined cavity thereof.
Figure 3:
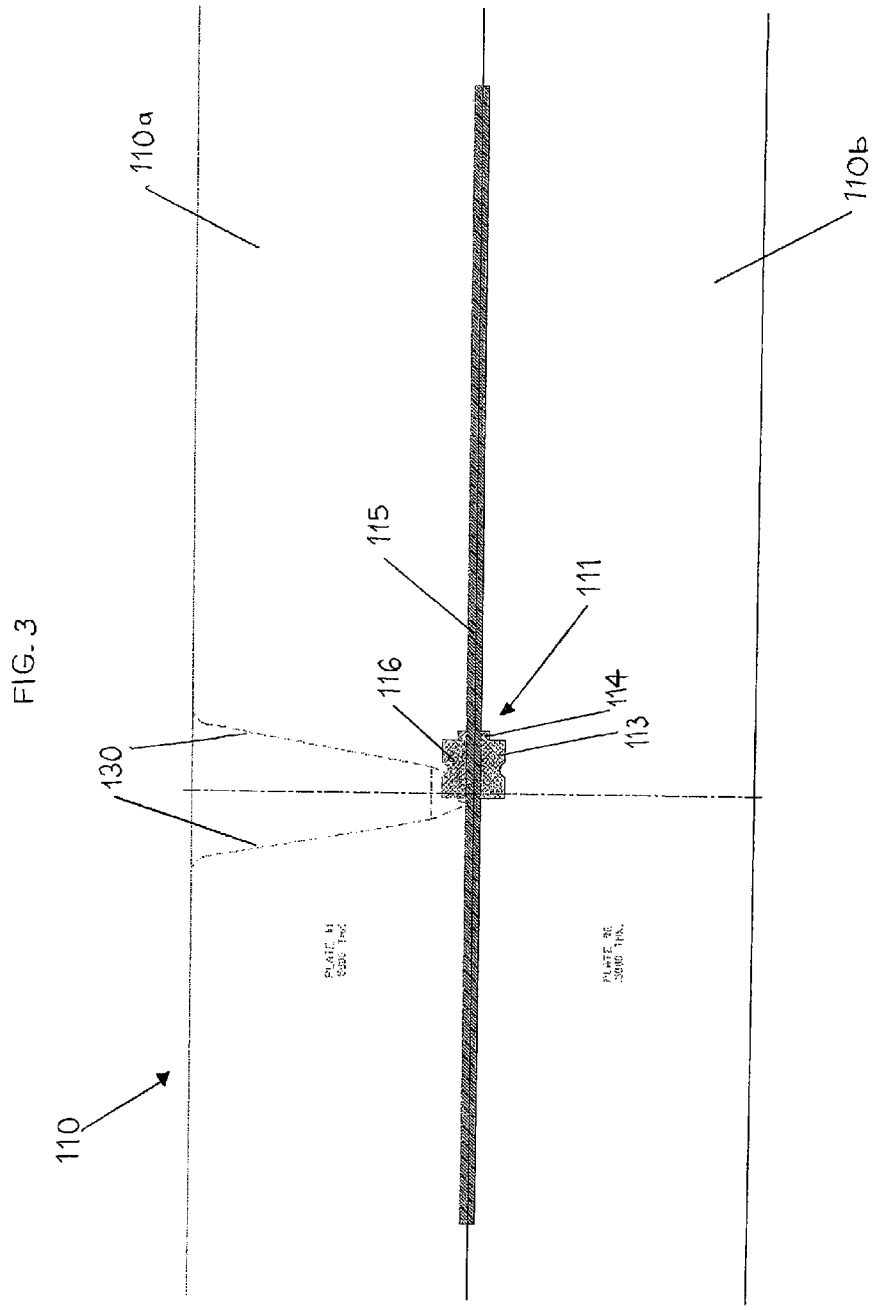
FIG. 3 shows a cross section of a liquid injection mold after injection of an elastomer such that the elastomer encases a wire.
Figure 4:
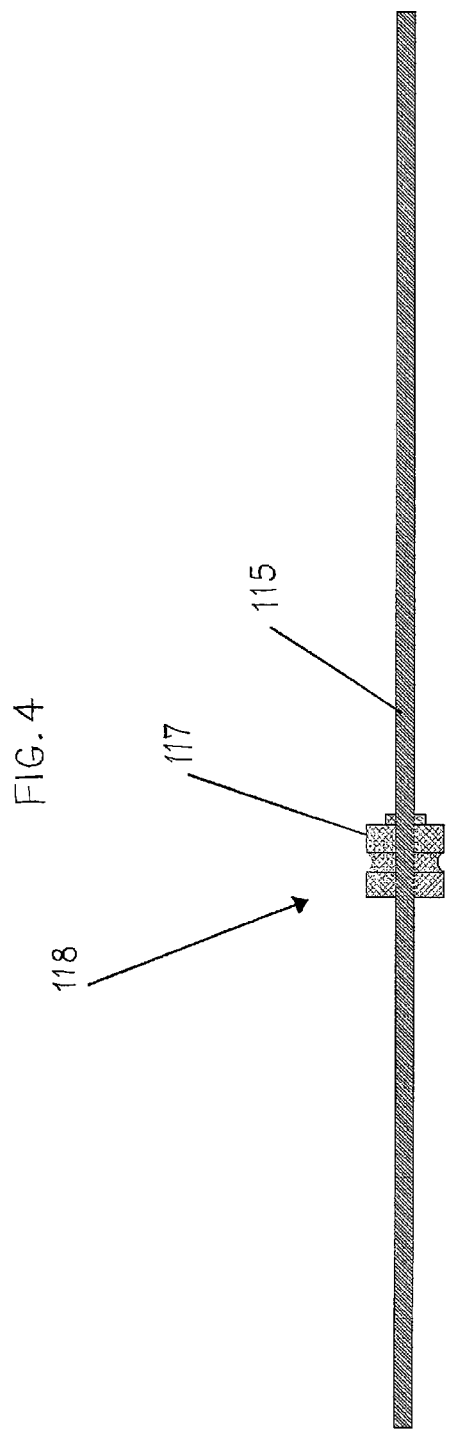
FIG. 4 shows a cross section of a feed thru assembly comprising an electrode and an elastomer member.

FIG. 2 depicts a cross section of the top plate 110a and bottom plate 110b of mold cavity 111 after a center electrode 115 is placed in electrode holding portion 112 (step 1300). FIG. 3 depicts a cross section of mold cavity 111, having top plate 110a and bottom plate 110b, after liquid elastomer 116 is injected through one or more of runners 130 to fill first and second cylindrical portions 113 and 114 (step 1301). Center electrode 115 is shown encased in liquid elastomer 116. Liquid elastomer 116 is then cured to form elastomer seal 117 (step 1302), as shown in FIG. 4. When the elastomer used is silicone, liquid injection molding is the preferred method of encasing center electrode 115 in elastomer. However, other elastomers may be used, as would be apparent. Depending on the specific elastomer to be used, other methods of molding may be used to encase center electrode 115 in elastomer. For example, conventional injection molding or transfer molding may be used to perform the molding process of the present invention.

FIG. 4 depicts a cross section of elastomer seal 117 and center electrode 115 after removal from mold 110 (step 1303). As a result of the molding and curing processes, elastomer seal 117 completely surrounds a portion of and is bonded to center electrode 115 to form feed thru assembly 118. As would be apparent, the contour of the circumference of elastomer seal 117 is dictated by the cylindrical portions 113 and 114 and can be tailored as desired to achieve other contours.

After the removal of feed thru assembly 118 from mold 110 (step 1303), feed thru assembly 118 is then inserted into a machined hole in a capacitor case (step 1304). Feed thru assembly 118 may be positioned through a hole at any suitable location on a capacitor case. Additionally, a primer may be used to improve the bond between the elastomer seal and the capacitor case. Suitably, when the elastomer seal is silicone, a self-bonding silicone may be used.

Figure 12:
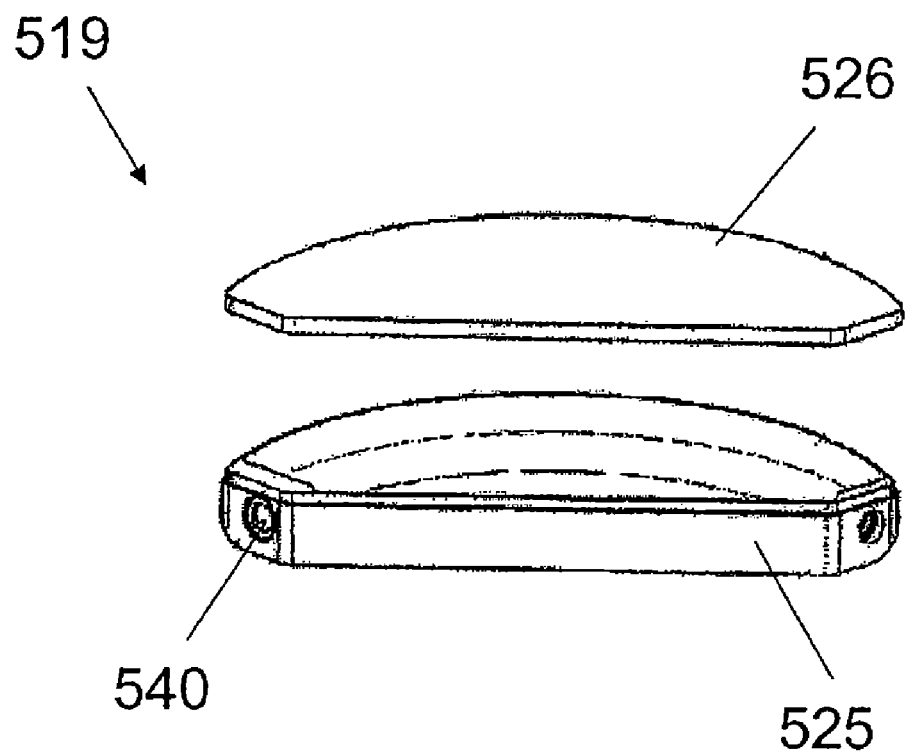
FIG. 12 shows a capacitor case comprising a base and a lid.

With reference to FIG. 12, feed thru assembly 118 may be placed through machined hole 540 on the side of capacitor case 525, or on the portion of the capacitor case that forms the case lid 526. As would be apparent, machined hole 540 may be formed by laser cutting, drilling, beveling, or any other known method. Feed thru assembly 118 may be placed through machined hole 540 from either the outside or inside of capacitor case 525. After feed thru assembly 118 is placed through machined hole 540, suitable connections may be made between center electrode 115 and the capacitor inside capacitor case 526.

Figure 14:
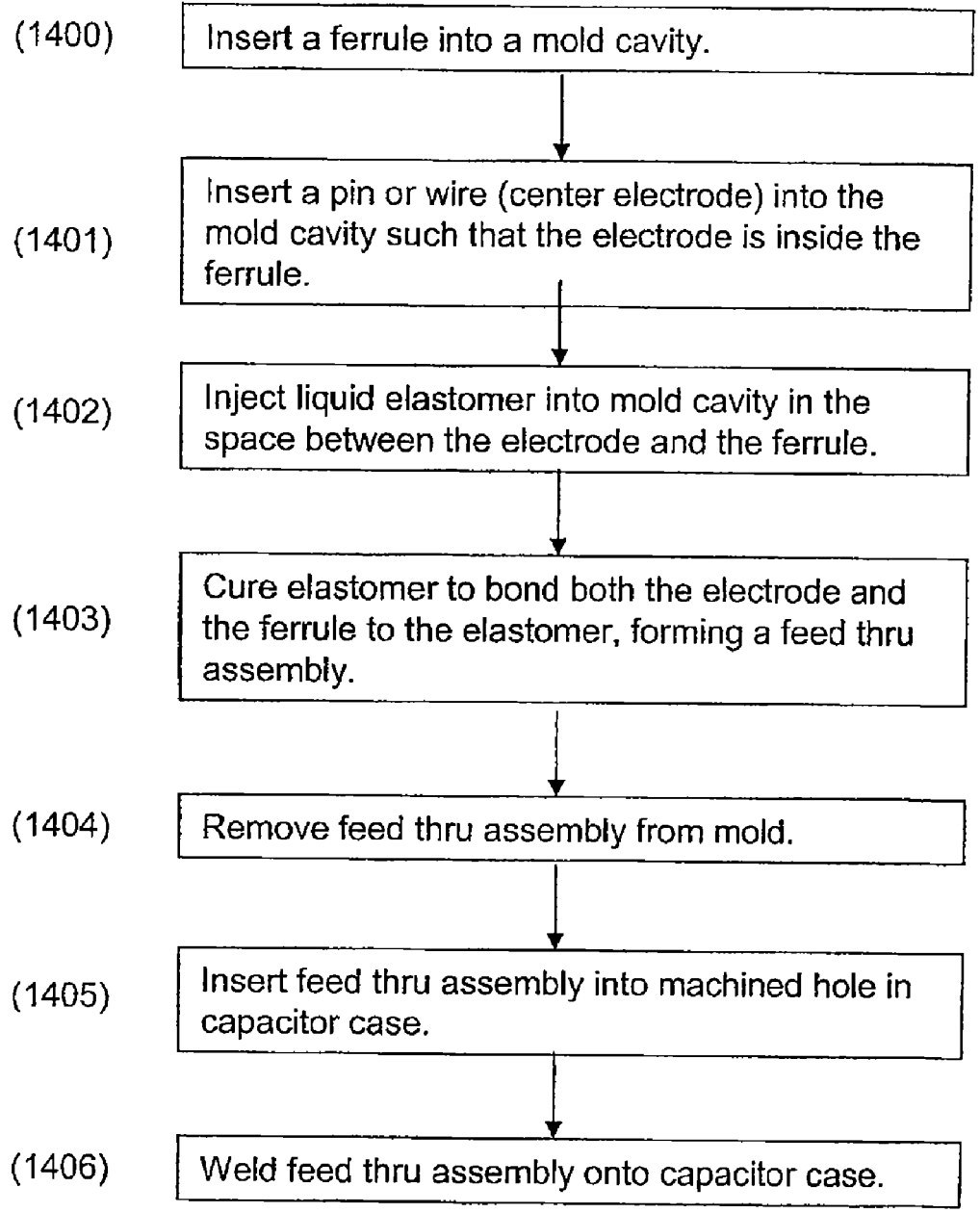
FIG. 14 shows a flowchart of a process for manufacturing the feed thru assembly of FIG. 8.

In a second embodiment, the present invention provides for a process of manufacturing a combination electrode and feed thru assembly in which the completed assembly comprises a ferrule, a center electrode, and a molded elastomer seal. This process is illustrated in FIGS. 5-11 and described in FIG. 14. FIG. 14 (steps 1400-1406) is a flow chart of the process according to the second embodiment. This process is merely exemplary and may include only some of the outlined steps and may include additional steps.

Figure 5:
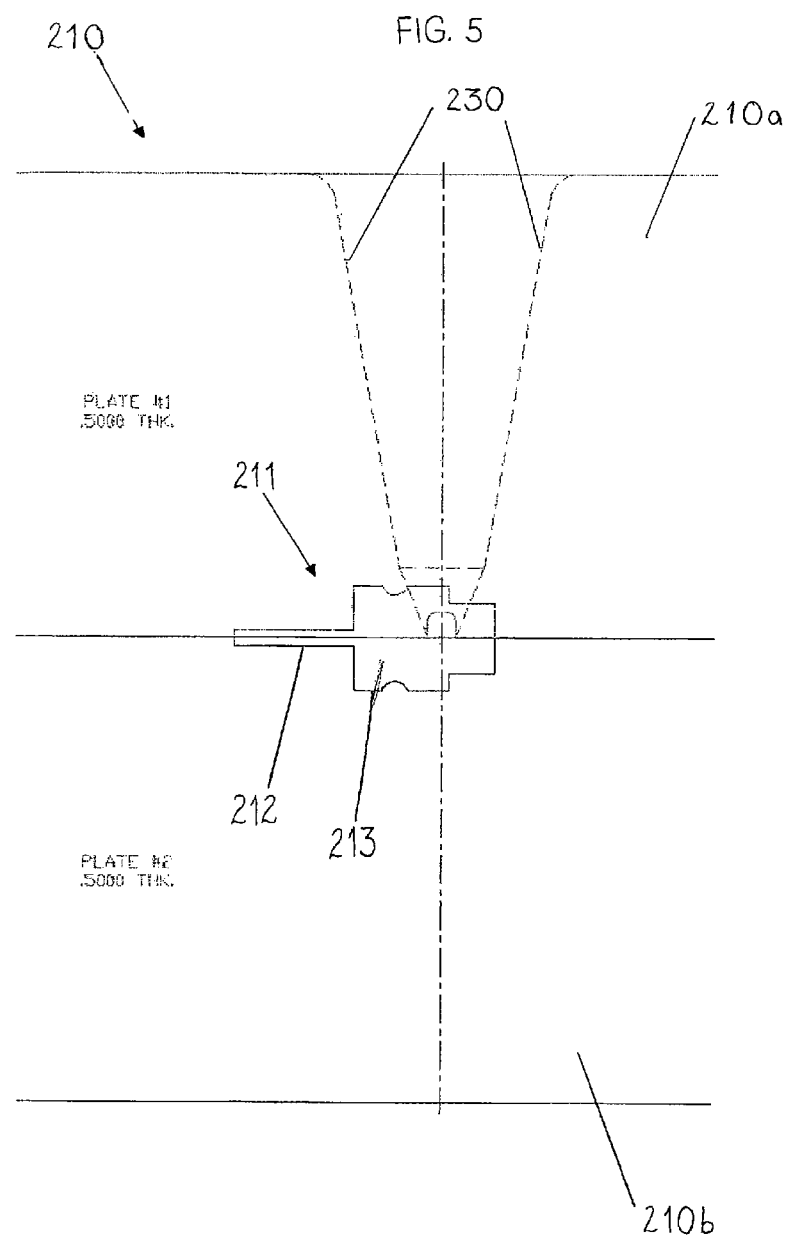
FIG. 5 shows a cross section of an empty liquid injection mold with cavities therein for use in a second embodiment of the current invention.

FIG. 5 illustrates a cross section of a mold 210 comprising a mold cavity 211. Mold 210 may be made of two halves, shown as top plate 210a and bottom plate 210b, which can be held together in proper alignment to form mold cavity 211. Although a single cavity is shown, the mold used in the present invention could contain two or more cavities. Mold cavity 211 has an electrode holding portion 212 to secure the electrode. Electrode holding portion 212 can be entirely contained within mold 210, as shown in FIG. 5, or could extend the full width of the mold to allow the electrode inserted therein to protrude from one or more sides of the mold.

Electrode holding portion 212 as shown in FIG. 5 is designed to receive a pin. Alternatively, electrode holding portion 212 could be shaped so as to accommodate a center electrode in the shape of a wire. Electrode holding portion 212 could also be provided in a variety of other shapes to accommodate, for example, a wire with a bend in at least one end. Mold cavity 211 also has a first cylindrical portion 213 that is filled with elastomer during the injection step. When the process is to be achieved by liquid injection molding, mold 210 may also be provided with one or more runners 230 to deliver liquid elastomer to mold cavity 211.

Figure 6:
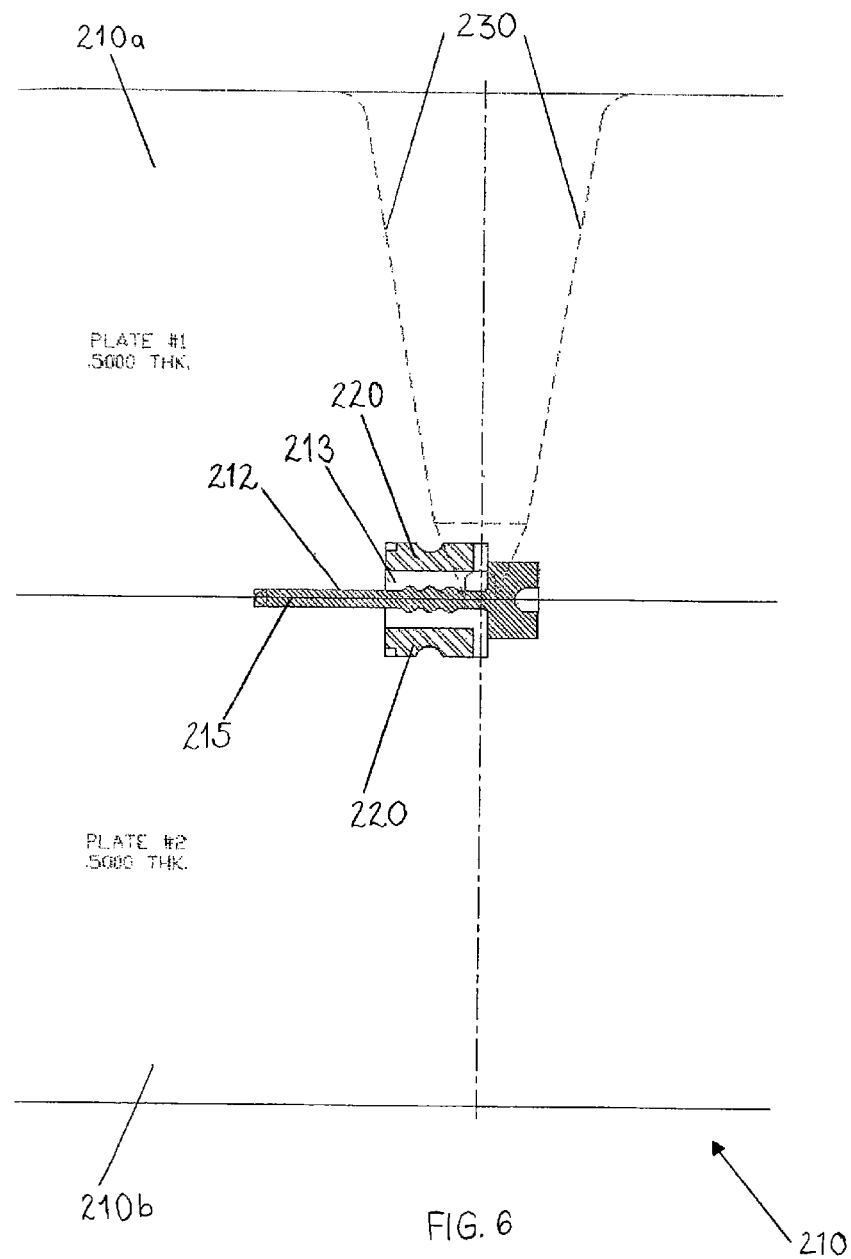
FIG. 6 shows a cross section of a liquid injection mold with a wire and a ferrule inserted therein.

FIG. 6 depicts a cross section of mold 210 having a top plate 210a and a bottom plate 210b, with a ferrule 220 placed in mold cavity 211 (step 1400) and a center electrode 215 placed in electrode holding portion 212 (step 1401). Suitably, when the completed feed thru is to be inserted into an aluminum capacitor case, ferrule 220 is constructed of Aluminum 4047, Aluminum 3003, or any Series 11 aluminum. Alternatively, when a stainless steel capacitor case is to be used, ferrule 220 may be constructed of Stainless Steel of grades 304L or 316L. As would be apparent, a variety of other metals could be used.

Figure 7:
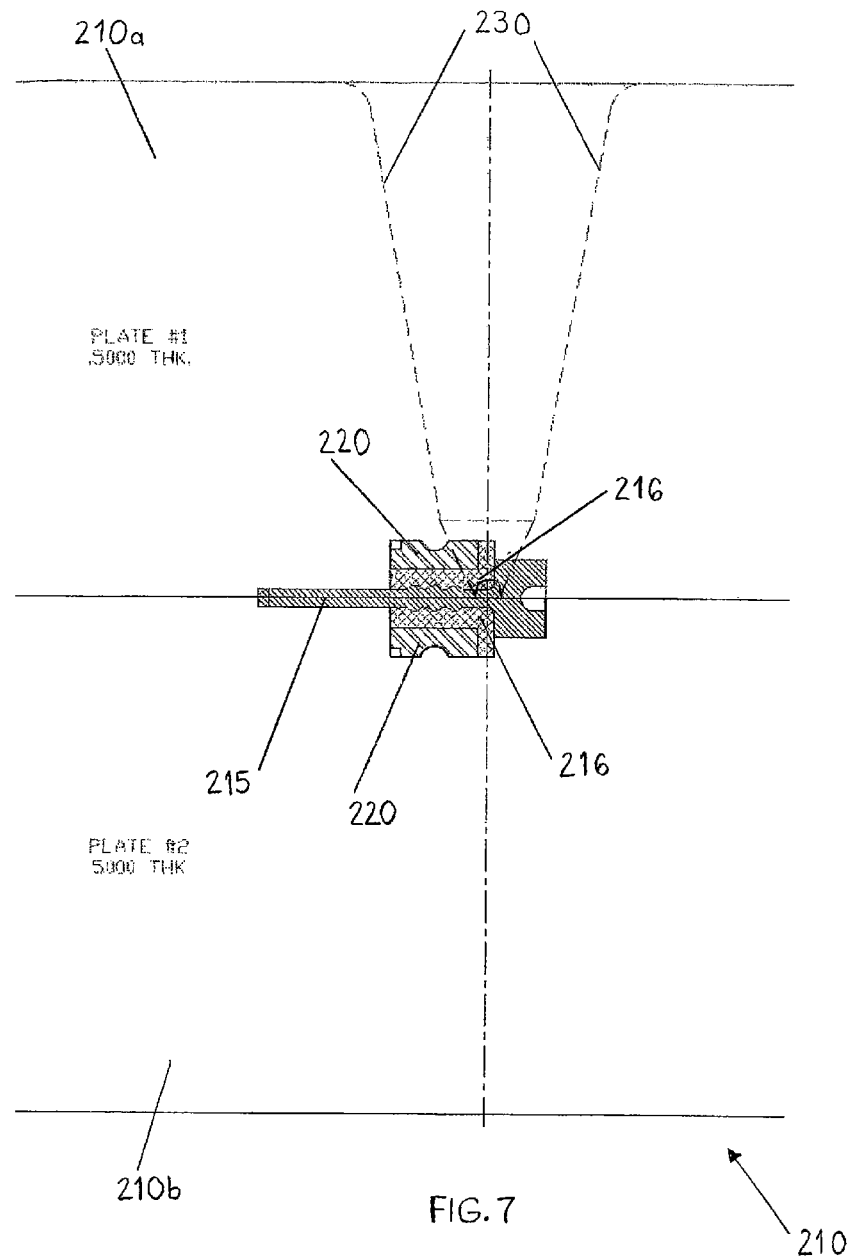
FIG. 7 shows a cross section of a liquid injection mold with a wire and a ferrule inserted therein after a liquid elastomer is injected into the remaining mold cavity.

FIG. 7 illustrates a cross section of top plate 210a and bottom plate 210b of mold 210 after a liquid elastomer 216 is injected through one or more of runners 230 into mold cavity 211 (step 1402). Liquid elastomer 216 fills the space between ferrule 220 and center electrode 215, thereby encasing electrode 215. Liquid elastomer 216 is then cured to form elastomer seal 217 (step 1403). When the elastomer used is silicone, liquid injection molding is the preferred method of encasing center electrode 215 in elastomer 216. Additionally, other methods of molding may be used to encase center electrode 215 in elastomer 216 depending on the specific elastomer material to be used. For example, conventional injection molding or transfer molding may be used to perform the molding process of the present invention.

Figure 8:
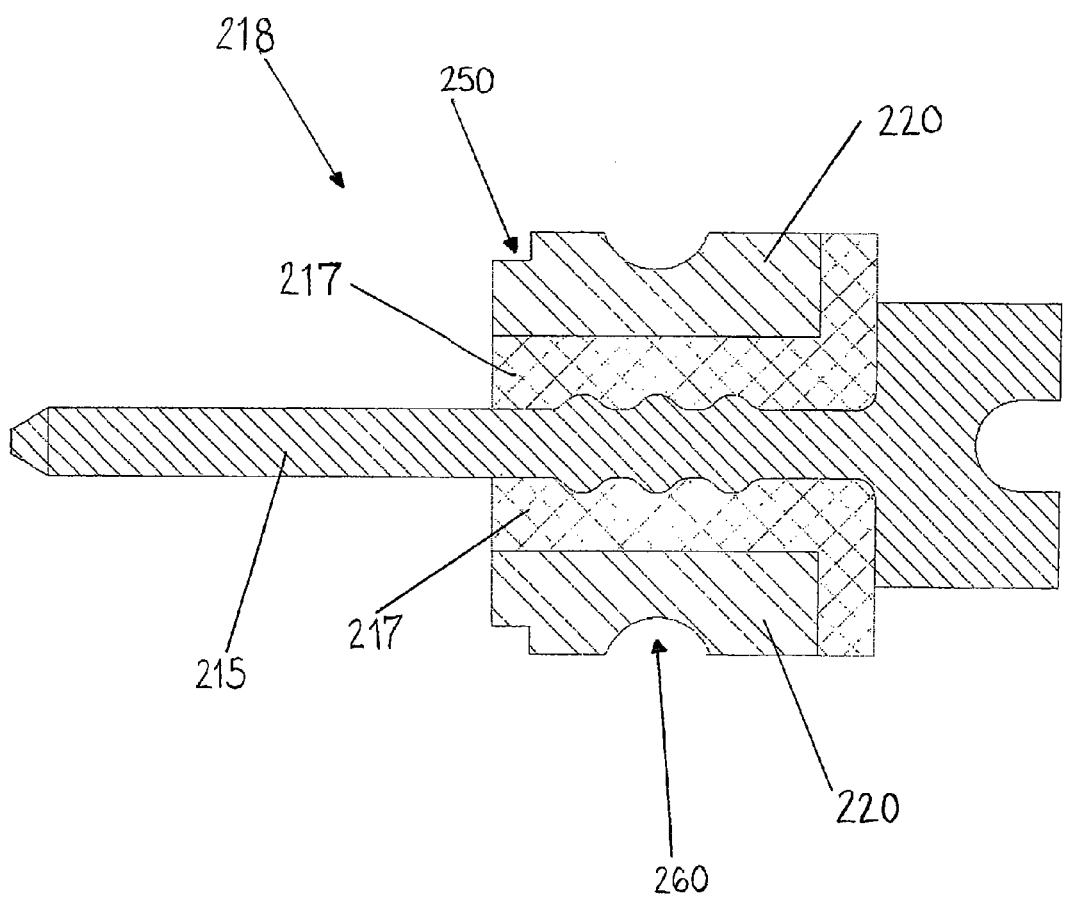
FIG. 8 shows a cross section of a feed thru assembly comprising an electrode, a ferrule, and an elastomer member after it is removed from the mold.
Figure 9:
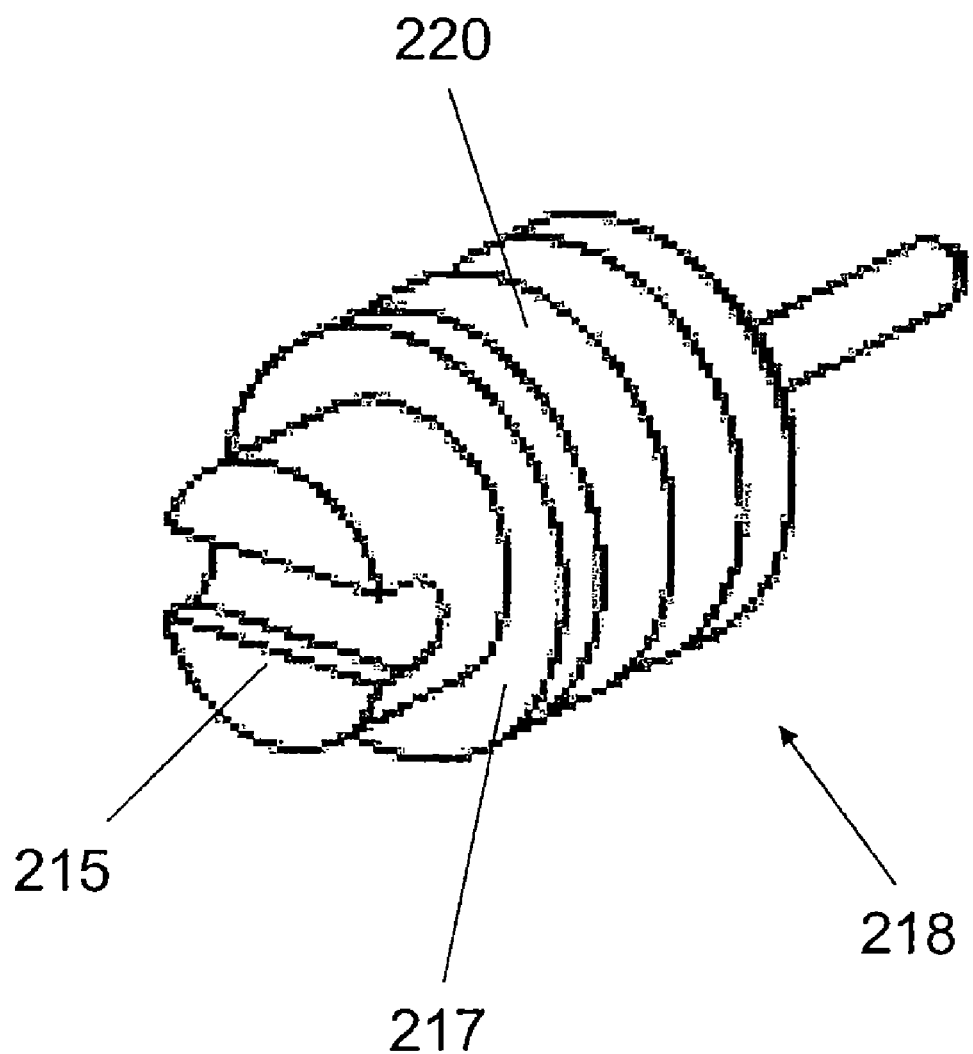
FIG. 9 shows a perspective view of the feed thru assembly of FIG. 8.

FIG. 8 depicts a cross section of feed thru assembly 218 after it is removed from mold 210 (step 1404). In this embodiment, the center electrode 215 of feed thru assembly 218 is a pin. FIG. 9 is a perspective view of feed thru assembly 218. As shown in FIG. 8, elastomer seal 217 completely surrounds at least a portion of center electrode 215. As a result of the molding and curing processes, elastomer seal 217 is bonded to both center electrode 215 and ferrule 220 to form feed thru assembly 218. Elastomer seal 217 covers at least one end surface of ferrule 220. Additionally, ferrule 220 may be provided with a notch 250 around the periphery thereof in order to facilitate placement into a capacitor case. Ferrule 220 may also have a centrally located groove 260 running around the perimeter thereof to facilitate placement into a mold. After removal from mold 210 (step 1404), feed thru assembly 218 is then inserted into a machined hole (step 1405) in a capacitor case sized to receive ferrule 220, and welded onto capacitor case 519 (step 1406). Preferably, the welding step 1406 is accomplished by laser welding. However, other welding techniques may be used to accomplish this step. For example, welds may be placed around the insertion point.

Figure 10:
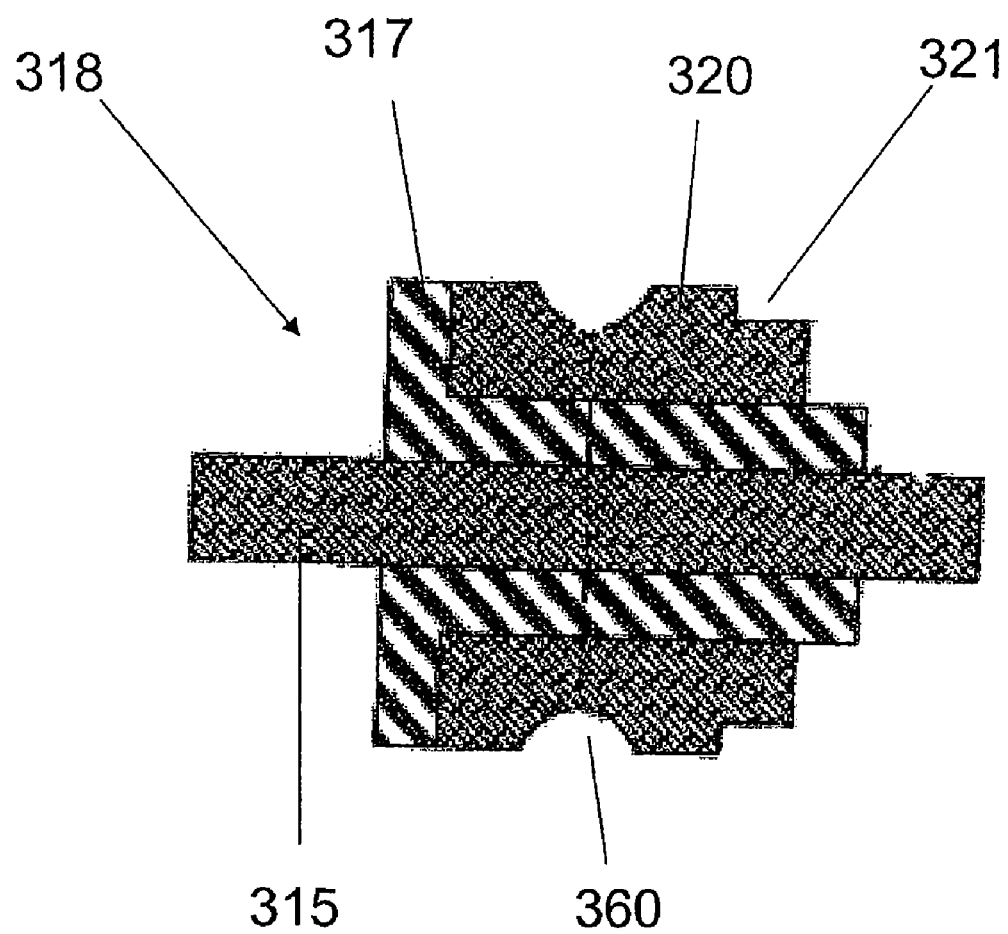
FIG. 10 shows a cross section of a feed thru assembly comprising an electrode, a ferrule, and an elastomer member, wherein elastomer covers one end of the ferrule, and wherein a wire functions as the electrode.
Figure 11:
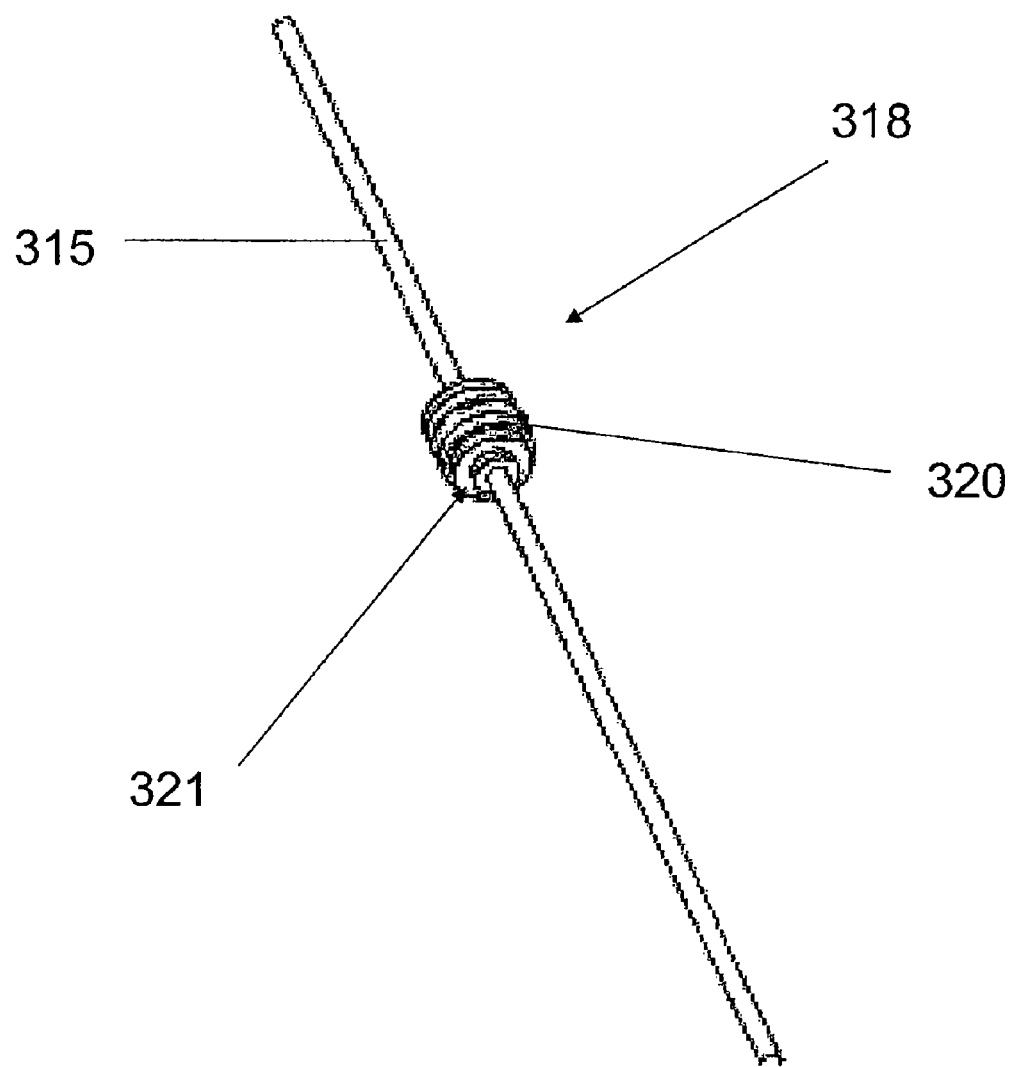
FIG. 11 shows a perspective view of the feed thru assembly of FIG. 10.

In another suitable embodiment, the mold cavity is designed to allow an elastomer seal 317 to form around a wire and one or more end surfaces of a ferrule 320, as illustrated in FIGS. 10 and 11. FIG. 10 illustrates a cross section of a feed thru assembly 318 of this embodiment where the center electrode 315 is a wire. As shown in FIG. 10, elastomer seal 317 covers at least one end surface of ferrule 320. Ferrule 320 may be provided with a notch 321 around the periphery thereof in order to facilitate placement into a capacitor case. Ferrule 320 may also have a centrally located groove 360 running around the perimeter thereof to facilitate placement into a mold. A ferrule with these features may be used in any of the stated embodiments of this invention. FIG. 11 is a perspective view of a complete feed thru assembly 318.

The embodiments illustrated in FIGS. 8-11 allow for improved sealing and insulation properties between the components of the feed thru assembly and a capacitor case. Although electrodes are shown in the form of a wire or pin, the electrode in any embodiment of the present invention could be in a variety of shapes to meet specific construction requirements, as would be apparent to one of ordinary skill in the art.

Any embodiment of a feed thru case according to the present invention may be positioned through a hole at any suitable location on a capacitor case. For example, with reference to FIG. 12, a feed thru assembly may be placed through a machined hole 540 on the side of the base 525 of a capacitor case 519. Machined hole 540 could also be provided on lid 526, or at any other location on capacitor case 519. As would be apparent, machined hole 540 may be formed by laser cutting, drilling, beveling, or any other known method. A feed thru assembly may be welded onto either the outside or inside of capacitor case 519. After the feed thru assembly is placed through machined hole 540, suitable connections may be made between a center electrode and the capacitor inside the capacitor case 526.

FIG. 12 illustrates an exemplary case 519 for an electrolytic capacitor. Case 519 includes a base 525 and a lid 526. In a finished case, lid 526 would be fixedly attached to base 525, such as by laser welding. Case 519 may include one or more openings 530 designed to receive a feed thru assembly of the present invention. As would be apparent to one skilled in the art, the openings could be provided on base 525, as shown, or, alternatively, on lid 526. Case 519 is intended only as an example of the type of capacitor case that could be used in the present invention. Different shapes and configurations consistent with the present invention could be used.

FIG. 13 is a flowchart of a preferred process for manufacturing the feed thru assembly according to the first embodiment of this invention. A pin or wire serving as a center electrode is inserted into a mold cavity designed to receive the pin or wire (step 1300). Liquid elastomer is then injected into a mold cavity (step 1301). The elastomer is then cured in order to bond the elastomer to the electrode, forming a feed thru assembly (step 1302). The feed thru assembly is then removed from the mold (step 1303), and the feed thru is inserted into a machined hole in a capacitor case (step 1304).

FIG. 14 is a flowchart of a preferred process for manufacturing the feed thru assembly according to the second embodiment of this invention. A ferrule is inserted into a mold cavity designed to receive the ferrule (step 1400). A pin or wire serving as a center electrode is inserted into the mold cavity such that the electrode is inside the ferrule (step 1401). The pin or wire may be placed inside the ferrule and inserted together with the ferrule into a mold cavity. Liquid elastomer is injected into the mold cavity in the space between the electrode and the ferrule (step 1402). The elastomer is then cured to bond both the center electrode and the ferrule to the elastomer, forming a feed thru assembly (step 1403). The feed thru assembly is removed from the mold (step 1404), and the feed thru assembly is inserted into a machined hole in a capacitor case (step 1405). The feed thru assembly is then welded onto the capacitor case (step 1406).

While various embodiments have been described above, it should be understood that they have been presented by way of example only, and not limitation. Thus, the breadth and scope of this disclosure should not be limited by any of the above-described exemplary embodiments, but should be defined only in accordance with the following claims and their equivalents. Additionally, all references cited herein are each entirely incorporated by reference herein, including all data, tables, figures, and text presented in the cited references.

The foregoing description of the specific embodiments will so fully reveal the general nature of the embodiments that others can, by applying knowledge within the skill of the art (including the contents of the references cited herein), readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A method for manufacturing a feed thru assembly for an electrolytic capacitor case, comprising:
    (a) inserting an electrode into a liquid injection mold;
    (b) injecting a liquid elastomer into said mold such that said liquid elastomer surrounds at least a portion of said electrode;
    (c) curing said elastomer to form a feed thru around a portion of said electrode; and
    (d) inserting a ferrule into said liquid injection mold prior to injecting said elastomer, such that said electrode is completely encircled along at least a portion thereof by said ferrule and wherein said ferrule has an inner diameter that is larger than the outer diameter of said electrode such that a space is created between said inner diameter of said ferrule and said outer diameter of said electrode.

2. The method of claim 1, wherein said mold has a cavity for receiving said ferrule, and wherein said cavity is longer than the length of said ferrule, such that, during said injecting step, said elastomer covers at least one end surface of said ferrule.

3. The method of claim 1, further comprising:
    (e) inserting said feed thru assembly into a machined hole in said capacitor case and welding said ferrule to said capacitor case.

4. The method of claim 1, wherein said feed thru provides electrical isolation between said electrode and said ferrule.

5. The method of claim 1, wherein said feed thru provides a liquid tight seal between said ferrule and said electrode.

6. A method for manufacturing a feed thru assembly for an electrolytic capacitor case, comprising:
    (a) inserting a ferrule and an electrode into a liquid injection mold such that said electrode is completely encircled along at least a portion thereof by said ferrule, wherein said ferrule has an inner diameter that is larger than the outer diameter of said electrode such that a space is created between said inner diameter of said ferrule and said outer diameter of said electrode;
    (b) injecting liquid elastomer into said mold such that said liquid elastomer fills the space between said ferrule and said electrode; and
    (c) curing said elastomer between said electrode and said ferrule.

7. The method of claim 6, further comprising:
    (d) inserting said feed thru assembly into a machined hole in said capacitor case.

8. The method of claim 7, further comprising:
    (e) welding said feed thru assembly to said capacitor case.

9. The method of claim 6, wherein said electrode is a pin or wire.

10. The method of claim 9, wherein said electrode is a pin comprising a pin head, and wherein said elastomer forms a barrier between said pin head and said ferrule.

11. The method of claim 6, wherein said mold has a cavity for receiving said ferrule, and wherein said cavity is longer than the length of said ferrule, such that, during said injecting step, said elastomer covers at least one end surface of said ferrule.

12. The method of claim 6, wherein said cured elastomer provides electrical isolation between said electrode and said ferrule.

13. The method of claim 6, wherein said cured elastomer provides a liquid tight seal between said electrode and said ferrule.

* * * * *